(12) United States Patent
Bovik

(10) Patent No.: US 10,529,066 B2
(45) Date of Patent: Jan. 7, 2020

(54) ASSESSING QUALITY OF IMAGES OR VIDEOS USING A TWO-STAGE QUALITY ASSESSMENT

(71) Applicant: Board of Regents, The Univeriaity of Texas System, Austin, TX (US)

(72) Inventor: Alan Bovik, Austin, TX (US)

(73) Assignee: Board of Regents, The University of Texas Systems, Austin, TX (US)

( * ) Notice: Subject to any disclaimer, the term of this patent is extended or adjusted under 35 U.S.C. 154(b) by 23 days.

(21) Appl. No.: 15/916,021

(22) Filed: Mar. 8, 2018

(65) Prior Publication Data
US 2018/0286032 A1 Oct. 4, 2018

Related U.S. Application Data

(60) Provisional application No. 62/481,241, filed on Apr. 4, 2017.

(51) Int. Cl.
*G06T 7/00* (2017.01)

(52) U.S. Cl.
CPC .. *G06T 7/0002* (2013.01); *G06T 2207/10004* (2013.01); *G06T 2207/10016* (2013.01); *G06T 2207/30168* (2013.01)

(58) Field of Classification Search
CPC ......... G06T 7/0002; G06T 2207/30168; G06T 2207/10004; G06T 2207/10016
USPC ........ 382/128, 115, 112, 173, 165, 117, 131, 382/190, 218, 100, 162, 132, 276, 280, 382/181, 209, 217; 600/300, 407, 425; 348/180, 189, E17.001
See application file for complete search history.

(56) References Cited

U.S. PATENT DOCUMENTS

| 7,590,287 | B2 * | 9/2009 | Lu ...................... G06K 9/00711 382/190 |
| 8,050,463 | B2 * | 11/2011 | Hamza .................. G06K 9/036 382/115 |
| 8,126,197 | B2 * | 2/2012 | Jones ..................... G06K 9/036 382/100 |

(Continued)

OTHER PUBLICATIONS

Yu et al., "Predicting Encoded Picture Quality in Two Steps is a Better Way," https://arxiv.org/pdf/1801.02016.pdf, Feb. 9, 2018, pp. 1-5.

(Continued)

*Primary Examiner* — Sheela C Chawan
(74) *Attorney, Agent, or Firm* — Robert A. Voigt, Jr.; Winstead PC

(57) ABSTRACT

A method, system and computer program product for assessing quality of images or videos. A quality assessment of an image or video to be processed is performed using a no-reference reference quality assessment algorithm. A quality measurement, such as a score, reflecting the quality of the image or video, is generated from the no-reference reference quality assessment algorithm. The image or video is then processed and a quality assessment of the processed image or video is performed using a reference quality assessment algorithm that is conditional on the quality measurement provided by the no-reference quality assessment algorithm. In this manner, a more accurate quality measurement of the image or video is provided by the reference quality assessment algorithm.

45 Claims, 8 Drawing Sheets

(56) References Cited

U.S. PATENT DOCUMENTS

| | | | |
|---|---|---|---|
| 8,660,372 B2* | 2/2014 | Bovik | G06K 9/00664 |
| | | | 382/190 |
| 9,025,910 B2* | 5/2015 | Liu | G06K 9/32 |
| | | | 382/298 |
| 2008/0207198 A1* | 8/2008 | Juric | H04B 17/23 |
| | | | 455/425 |
| 2012/0127297 A1* | 5/2012 | Baxi | G06T 7/0002 |
| | | | 348/79 |
| 2014/0126808 A1 | 5/2014 | Geisler et al. | |
| 2014/0354826 A1* | 12/2014 | Kolarov | H04N 17/002 |
| | | | 348/175 |
| 2015/0078670 A1 | 3/2015 | Reibman et al. | |
| 2016/0358321 A1 | 12/2016 | Xu et al. | |
| 2016/0379352 A1* | 12/2016 | Zhang | G06T 7/0002 |
| | | | 382/157 |
| 2017/0140518 A1 | 5/2017 | Liang et al. | |

OTHER PUBLICATIONS

Bampis et al., "SpEED-QA: Spatial Efficient Entropic Differencing for Image and Video Quality," IEEE Signal Processing Letters, vol. 24, No. 9, Sep. 2017, pp. 1333-1337.

International Search Report and Written Opinion of the International Searching Authority for International Application No. PCT/US2018/021597 dated May 15, 2018, pp. 1-7.

Saad et al., "Blind Image Quality Assessment: A Natural Scene Statistics Approach in the DCT Domain," IEEE Transactions on Image Processing, vol. 21, No. 8, Aug. 2012, pp. 3339-3352.

* cited by examiner

ASSESSING QUALITY OF IMAGES OR VIDEOS USING A TWO-STAGE QUALITY ASSESSMENT

TECHNICAL FIELD

The present invention relates generally to image or video quality assessment, and more particularly to assessing the quality of images or videos using a two-stage quality assessment, whereby the image or video to be processed (e.g., compressed) is first quality assessed using a no-reference quality assessment algorithm and later quality assessed using a reference quality assessment algorithm conditional on the no-reference quality assessment.

BACKGROUND

Image or video quality is a characteristic of an image or video that is characterized by the perceived image degradation (typically, compared to an ideal image or video). Systems, such as imaging systems or streaming video systems, often introduce some amounts of distortion or artifacts on an image or video (including three-dimensional images or videos), making them less pleasurable to view or harder to interpret, hence quality assessment is an important problem.

The quality of the image/video may be assessed either by conducting subjective experiments or by developing objective image quality assessment (IQA) algorithms. Conducting subjective experiments is very difficult and does not produce a real time solution. Hence, many objective IQA algorithms that produce quality predictions that correlate well with subjective ratings have been developed. One type of IQA algorithm is a reference algorithm, such as a full reference (FR) algorithm, which assesses the quality of a test image/video by comparing it against a reference image/video that is presumed to have acceptable (high) quality. Another type of reference algorithm is a reduced reference (RR) algorithm, which assesses the quality of a test image/video with only partial information about a reference image/video that is presumed to have acceptable quality. Another type of IQA algorithm is a no-reference (NR) algorithm, which assesses the quality of a test image/video without any reference to any original one. Such an original may not exist.

Currently, many image/video systems assess the quality of an image/video via a reference algorithm, such as via an FR algorithm, as the image/video is processed (e.g., compressed) or afterwards, such as in streaming video systems. However, if the image or video content being processed was not of sufficiently high quality prior to processing, then the reference algorithm may yield incorrect measurements of the image or video quality. Comparing a possibly distorted image or video against a reference image or video that is distorted leaves poor basis for comparison.

SUMMARY

In one embodiment of the present invention, a method for assessing quality of images or videos comprises performing, by a processor, a first quality assessment of an image or a video to be processed using a no-reference quality assessment algorithm. The method further comprises generating a first score as a result of performing the first quality assessment of the image or the video, where the first score reflects a quality of the image or the video. The method additionally comprises performing, by the processor, a second quality assessment of the image or the video using a reference quality assessment algorithm conditional on the first score.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The principles of the present invention provide a more accurate assessment of the quality of images or videos by utilizing a two-stage quality assessment, whereby the image or video to be processed (e.g., compressed) is first quality assessed using a no-reference quality assessment algorithm and later quality assessed using a reference quality assessment algorithm conditional on the no-reference quality assessment as discussed further below.

Figure 1:
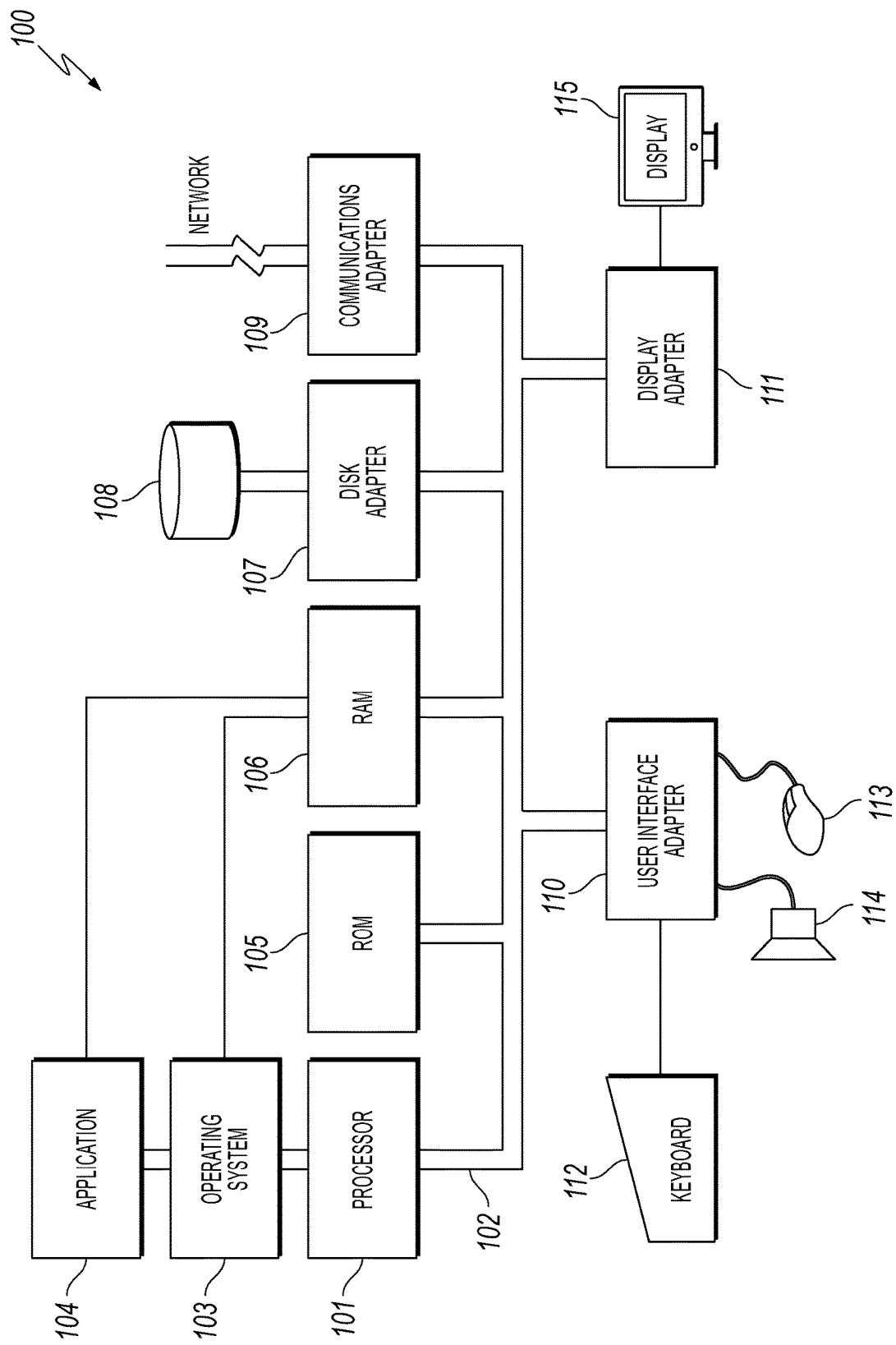
FIG. 1 illustrates a hardware configuration of a visual processing system which is representative of a hardware environment for practicing the present invention.

Referring now to the Figures in detail, FIG. 1 illustrates a hardware configuration of a visual processing system 100 which is representative of a hardware environment for practicing the present invention. Visual processing system 100 may be any type of computing device (e.g., portable computing unit, Personal Digital Assistant (PDA), smartphone, laptop computer, mobile phone, navigation device, game console, desktop computer system, workstation, Internet appliance and the like) configured with the capability of assessing the quality of images or videos using a two-stage quality assessment, whereby the image or video to be processed (e.g., compressed) is first quality assessed using a no-reference quality assessment algorithm and later quality assessed using a reference quality assessment algorithm conditional on the no-reference quality assessment.

Referring to FIG. 1, visual processing system 100 may have a processor 101 coupled to various other components by system bus 102. An operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, an application for assessing the quality of images or videos using a two-stage quality assessment, whereby the image or video to be processed (e.g., compressed) is first quality assessed using a no-reference quality assessment algorithm and later quality assessed using a reference quality assessment algorithm conditional on the no-reference quality assessment as discussed below in association with FIGS. 2-8.

Referring again to FIG. 1, read-only memory ("ROM") 105 may be coupled to system bus 102 and include a basic input/output system ("BIOS") that controls certain basic functions of visual processing system 100. Random access memory ("RAM") 106 and disk adapter 107 may also be coupled to system bus 102. It should be noted that software components including operating system 103 and application 104 may be loaded into RAM 106, which may be visual processing system's 100 main memory for execution. Disk adapter 107 may be an integrated drive electronics ("IDE") adapter that communicates with a disk unit 108, e.g., disk drive. It is noted that the program for assessing the quality of images or videos using a two-stage quality assessment, whereby the image or video to be processed (e.g., compressed) is first quality assessed using a no-reference quality assessment algorithm and later quality assessed using a reference quality assessment algorithm conditional on the no-reference quality assessment, as discussed below in association with FIGS. 2-8, may reside in disk unit 108 or in application 104.

Visual processing system 100 may further include a communications adapter 109 coupled to bus 102. Communications adapter 109 may interconnect bus 102 with an outside network thereby allowing visual processing system 100 to communicate with other devices.

I/O devices may also be connected to visual processing system 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to visual processing system 100 through keyboard 112 or mouse 113 and receiving output from visual processing system 100 via display 115 or speaker 114. Other input mechanisms may be used to input data to visual processing system 100 that are not shown in FIG. 1, such as display 115 having touch-screen capability and keyboard 112 being a virtual keyboard. Visual processing system 100 of FIG. 1 is not to be limited in scope to the elements depicted in FIG. 1 and may include fewer or additional elements than depicted in FIG. 1. For example, visual processing system 100 may be a digital camera without various elements shown in FIG. 1, such as keyboard 112, mouse 113, etc. In another example, while FIG. 1 illustrates visual processing system 100 with a single processor, visual processing system 100 may include multiple processors.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As discussed in the Background section, currently, many image/video systems and devices assess the quality of the image/video via a reference algorithm, such as via a FR algorithm, as the image/video is processed (e.g., compressed) or afterwards, such as in streaming video systems. However, if the image or video content being processed was not of ideal quality prior to processing, then the reference algorithm may yield incorrect measurements of the image or video quality.

The principles of the present invention provide a means for improving the quality measurement of the reference algorithm by having the image or video to be processed (e.g., compressed) quality assessed using a no-reference quality assessment algorithm and later quality assessed using a reference quality assessment algorithm conditional on the no-reference quality assessment as discussed below in connection with FIGS. 2-8.

Figure 2:
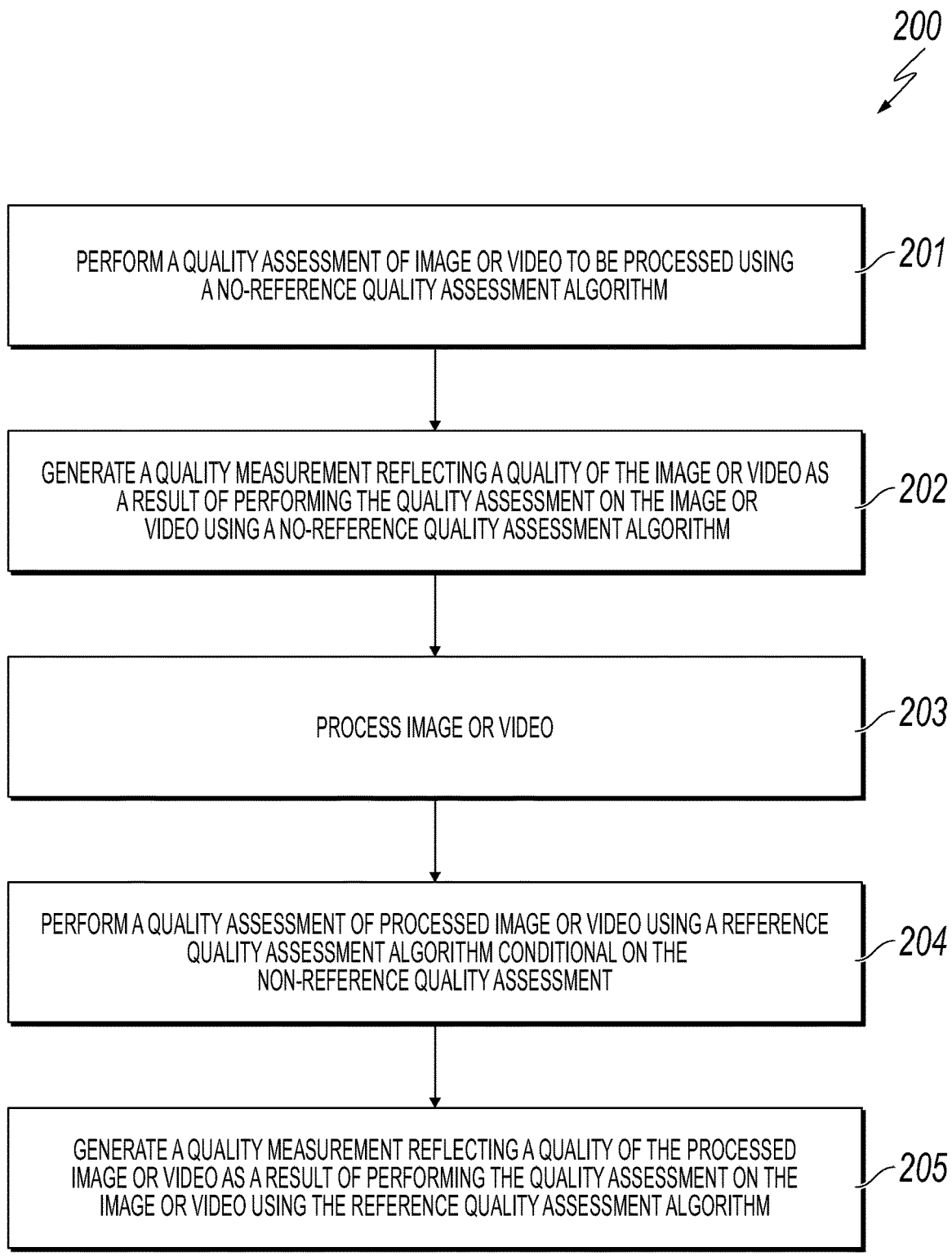
FIG. 2 is a flowchart of a method for assessing the quality of images or videos by having the quality measurement of the reference quality assessment algorithm conditional on the no-reference quality assessment in accordance with an embodiment of the present invention.

FIG. 2 is a flowchart of a method 200 for assessing the quality of images or videos by having the quality measurement of the reference quality assessment algorithm conditional on the no-reference quality assessment in accordance with an embodiment of the present invention.

Referring to FIG. 2, in conjunction with FIG. 1, in step 201, visual processing system 100 performs a quality assessment of an image or video to be processed using a no-reference quality assessment algorithm. An "image," as used herein, refers to a representation of something, including in three-dimensions. Non-limiting examples of an image include a photograph, an image stored in a digital camera, an image captured from a digital camera sensor, etc. A "video," as used herein, refers to a digital recording of an image or set of images, including in three-dimensions. Non-limiting examples of a video include video streaming, such as via video on demand service providers. In one embodiment, the image or video includes "intentional" distortion, such as an intentional process (e.g., compression, scaling up, scaling down, resizing, interpolation, color transformation, color demosaicing, etc.) being performed on the image/video that that results in distortion.

"Quality assessment," as used herein, refers to assessing or measuring the perceived degradation or distortion in comparison to an ideal or perfect image/video. Such distortion may include blurring, noise, packet loss, etc.

"Processing," as used herein, refers to processing of images or videos using mathematical operations by using any form of signal processing for which the input is an image, a series of images or a video and the output may be either an image or video or a set of characteristics or parameters related to the image/video. Non-limiting examples of processing include compression, denoising, deblurring, enhancement (e.g., defogging, contrast enhancement, inpainting, restoration, etc.), deblocking, transcoding, etc.

A "no-reference quality assessment algorithm," as used herein, refers to an algorithm which assesses the quality of the image/video without any reference to an original one, if it even exists. Non-limiting examples of no-reference quality assessment algorithms include (amongst many other similar algorithms) BRISQUE (blind/referenceless image spatial quality evaluator), DIIVINE (distortion identification-based image verity and integrity evaluation), BIQI (blind image quality index), NIQE (natural image quality evaluator), BLIINDS (blind image integrity notator using discrete cosine transform statistics), BLIINDS-II, BIQA (blind image quality assessment), IL-NIQE (integrated local natural image quality evaluator), etc.

In step 202, visual processing system 100 generates a quality measurement (e.g., score) reflecting a quality of the image or video as a result of performing the quality assessment on the image or video using the no-reference quality assessment algorithm. Such a measurement or score reflects the quality (e.g., lack of distortion) of the image or video.

In step 203, visual processing system 100 processes (e.g., compresses) the image or video.

In step 204, visual processing system 100 preforms a quality assessment of the processed image or video using a reference quality assessment algorithm conditional on the no-reference quality assessment. In one embodiment, the reference quality assessment algorithms takes into consideration the quality measurement (generated in step 202) provided by the no-reference quality assessment algorithm to assess the quality of the processed image or video. In this manner, the reference quality assessment algorithm is able to more accurately assess the quality of the image or video by having obtained information pertaining to the perceived degradation or distortion in the image or video prior to being processed. The "reference quality assessment algorithm conditional on the no-reference quality assessment," as used herein, refers to utilizing both the quality measurement of the reference quality assessment algorithm and the quality measurement of the no-reference quality assessment algorithm as discussed further below.

A "reference quality assessment algorithm," as used herein, includes full reference algorithms which assess the quality of a test image/video by comparing it with a reference image/video that is presumed to have excellent quality as well as reduced reference algorithms which assess the quality of a test image/video with only partial information about a reference image/video that is presumed to have excellent quality. Non-limiting examples of reference quality assessment algorithms include perceptual quality, structural information, structural similarity (SSIM), multi-scale SSIM, visual information fidelity (VIF), visual signal-to-noise ratio (VSNR), peak signal-to-noise ratio (PSNR), noise quality measure (NQM), most apparent distortion (MAD), reduced reference entropic differencing (RRED), spatio-temporal RRED (ST-RRED), spatial efficient entropic differencing for image and video quality (SpEED-QA), etc.

In step 205, visual processing system 100 generates a quality measurement (e.g., score) reflecting a quality of the processed image or video as a result of performing the quality assessment on the image or video using the reference quality assessment algorithm.

The quality measurement of the no-reference quality assessment algorithm is utilized by the reference quality assessment algorithm as discussed below.

A diagram of assessing the quality of images or videos using the method of FIG. 2 is provided below in connection with FIG. 3 in accordance with an embodiment of the present invention.

Figure 3:
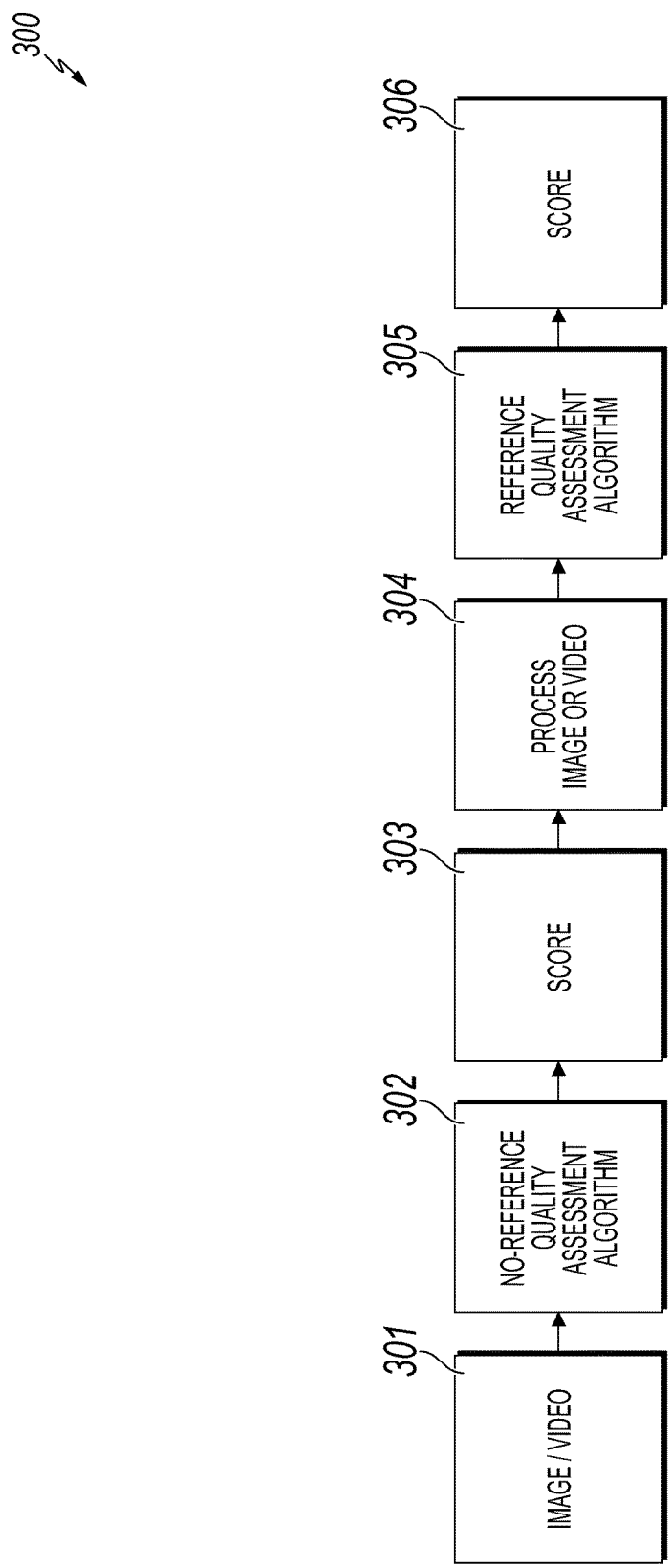
FIG. 3 is a diagram of assessing the quality of images or videos using the method of FIG. 2 in accordance with an embodiment of the present invention.

Referring to FIG. 3, the quality of an image or video 301 is assessed by a no-reference quality assessment algorithm 302 which generates a score or measurement 303. The image or video 301 is processed 304 and the processed image or video is quality assessed by a reference quality assessment algorithm 305 using score 303 to generate a more accurate and complete score or measurement 306.

Figure 4:
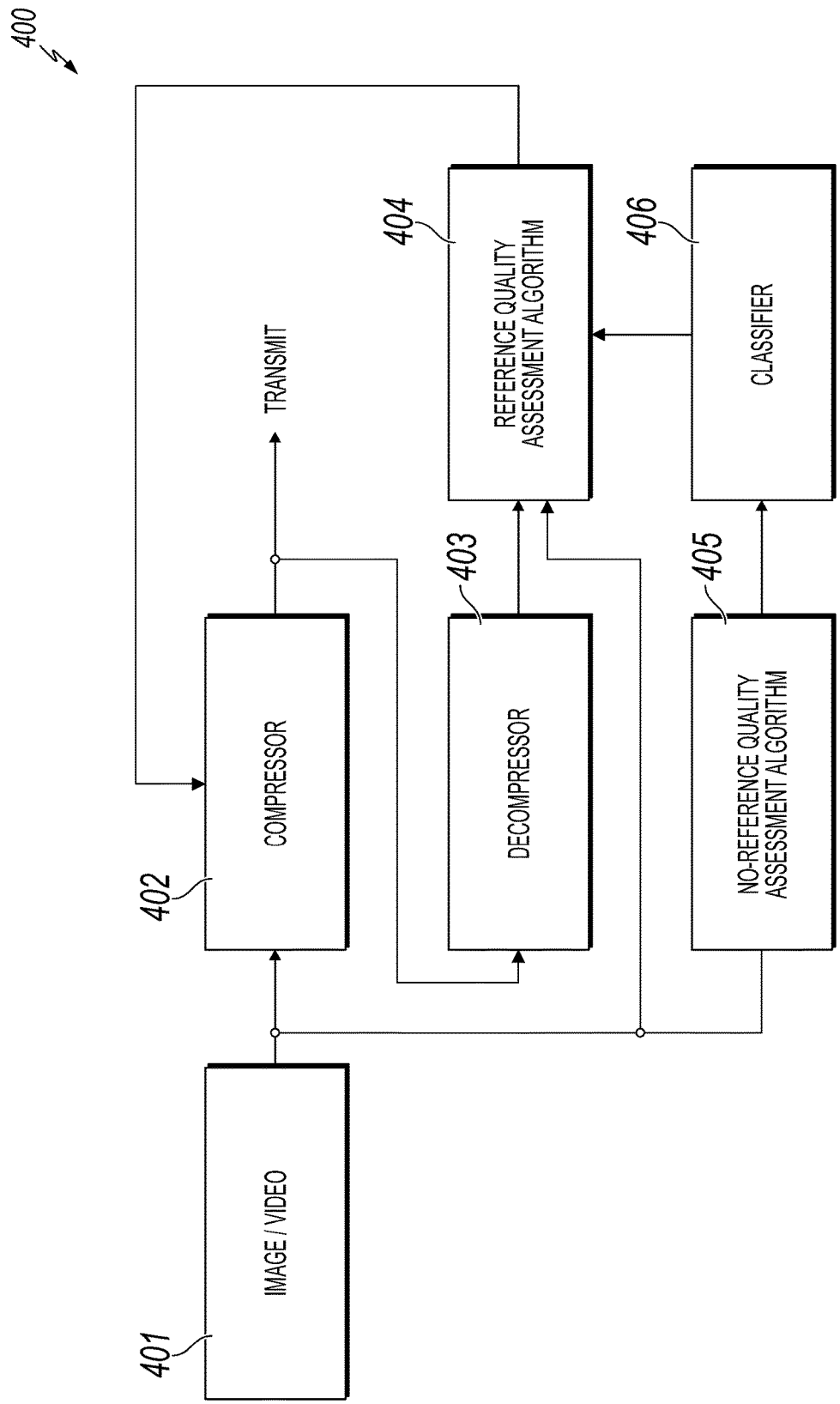
FIG. 4 is another illustration of assessing the quality of images or videos using the method of FIG. 2 in accordance with an embodiment of the present invention.

Another illustration of assessing the quality of images or videos using the method of FIG. 2 is provided below in connection with FIG. 4 in accordance with an embodiment of the present invention. In the illustration of FIG. 4, the source image/video may be utilized by a video on demand service provider.

Referring to FIG. 4, an image/video 401 may be processed, such as being compressed by a compressor 402. While FIG. 4 illustrates the process of compression/decompression, it is noted that the principles of the present invention are applied to other types of processing operations, such as denoising, deblurring, enhancement, etc.

The compressed image/video may then be transmitted or decompressed by decompressor 403. In one embodiment, compressor 402, decompressor 403 are software modules of application 104. The decompressed image/video may then be quality assessed by a reference quality assessment algorithm 404 whose quality measurement, such as via a score as discussed above, is provided to compressor 402 in order for compressor 402 to adaptively compress the current or future images/videos in a manner that will result in a greater quality image/video. That is, compressor 402 may utilize the quality measurement provided by reference quality assessment algorithm 404 to determine the particular type of compression method to be utilized, the compression ratio to be utilized, etc.

Alternatively, the image/video 401 may be directly quality assessed by reference quality assessment algorithm 404 whose quality measurement, such as via a score as discussed above, is provided to compressor 402 in order for compressor 402 to adaptively compress the current or future images/videos in a manner that will result in a better quality image/video.

Furthermore, the image/video 401 may alternatively be quality assessed by a no-reference quality assessment algorithm 405 whose quality measurement, such as via a score as discussed above, is analyzed by a classifier 406 which will classify the degradation or distortion type (e.g., defocus, motion blur, noise, camera shake, low-light noise, low-light blur, packet loss, distortion from upscaling, distortion from downscaling, distortion from deinterlacing, distortion from motion estimation or compensation, etc.). Such information will be provided to reference quality assessment algorithm 404 to more accurately assess the quality of the image/video. In one embodiment, classifier 406 is a software module of application 104.

Figure 5:
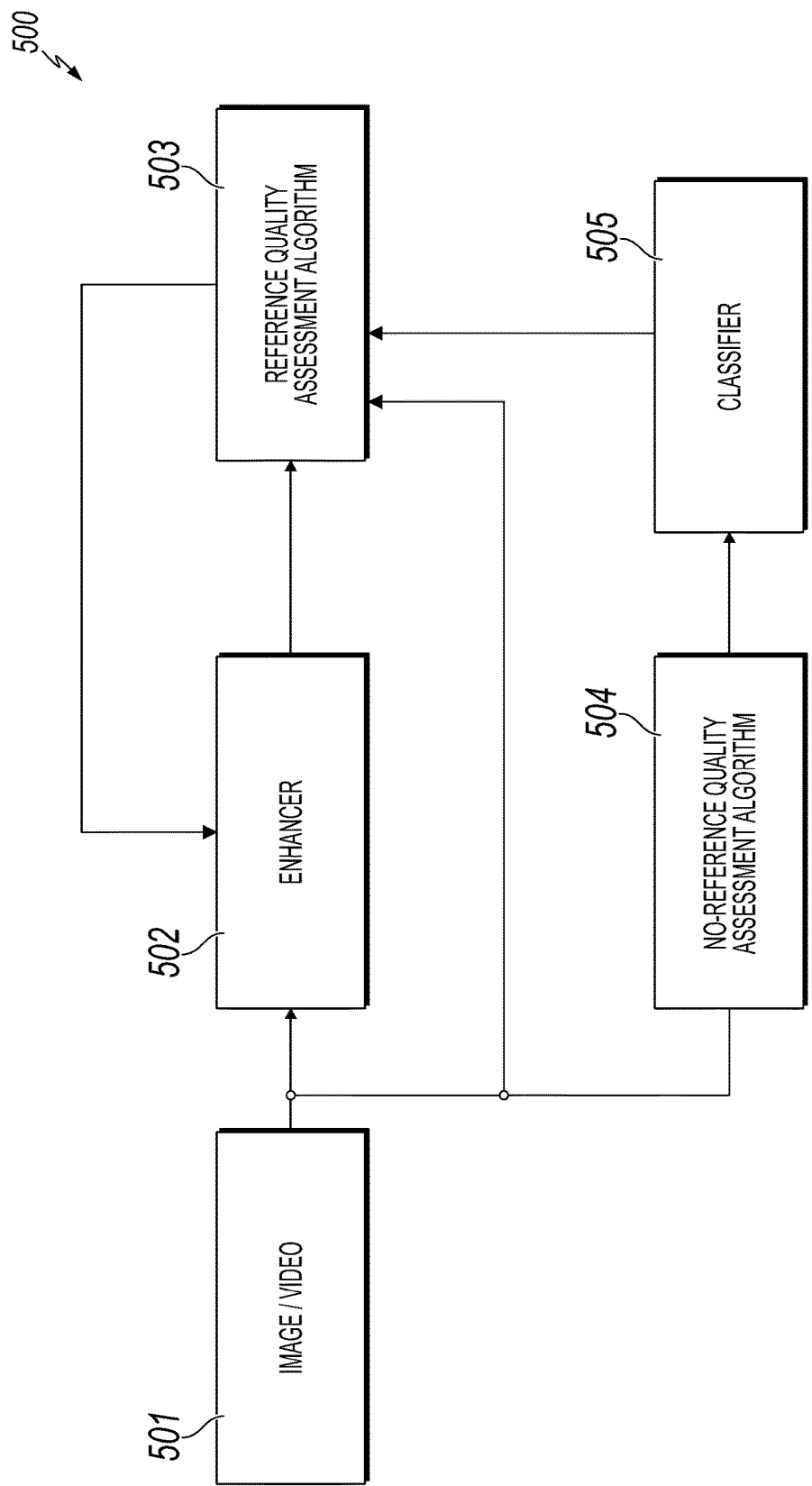
FIG. 5 is a further illustration of assessing the quality of images or videos using the method of FIG. 2 in accordance with an embodiment of the present invention.

A further illustration of assessing the quality of images or videos using the method of FIG. 2 is provided below in connection with FIG. 5 in accordance with an embodiment of the present invention. In the illustration of FIG. 5, the source image/video may be utilized by a video on demand service provider, a digital camera, etc.

Referring to FIG. 5, an image/video 501 may be processed, such as being enhanced by an enhancer 502. While FIG. 5 illustrates the process of enhancement, it is noted that the principles of the present invention are applied to other types of processing operations, such as compressing, denoising, deblurring, etc. In one embodiment, enhancer 502 is a software module of application 104.

The enhanced image/video may then be quality assessed by a reference quality assessment algorithm 503 whose quality measurement, such as via a score as discussed above, is provided to enhancer 502 in order for enhancer 502 to adaptively enhance current or future images/videos in a manner that will result in a greater quality image/video. That is, enhancer 502 may utilize the quality measurement provided by reference quality assessment algorithm 503 to determine the particular type of enhancement method to be utilized, the amount of noise removal, the amount of linear contrast adjustment, the amount of decorrelation stretch, etc.

Alternatively, the image/video 501 may be directly quality assessed by reference quality assessment algorithm 503 whose quality measurement, such as via a score as discussed above, is provided to enhancer 502 in order for enhancer 502 to adaptively enhance current or future images/videos in a manner that will result in a greater quality image/video.

Furthermore, the image/video 501 may alternatively be quality assessed by a no-reference quality assessment algorithm 504 whose quality measurement, such as via a score as discussed above, is analyzed by a classifier 505 which will classify the degradation or distortion type (e.g., defocus, motion blur, noise, camera shake, low-light noise, low-light blur, packet loss, distortion from upscaling, distortion from downscaling, distortion from deinterlacing, distortion from motion estimation or compensation, etc.). Such information will be provided to reference quality assessment algorithm 503 to more accurately assess the quality of the image/video. In one embodiment, classifier 505 is a software module of application 104. Non-limiting examples of classifier 505 include BIQI (blind image quality index) and DIIVINE (distortion identification-based image verity and integrity evaluation).

A further exemplary illustration of assessing the quality of images or videos using the method of FIG. 2 is provided below in connection with FIG. 6 in accordance with an embodiment of the present invention.

Figure 6:
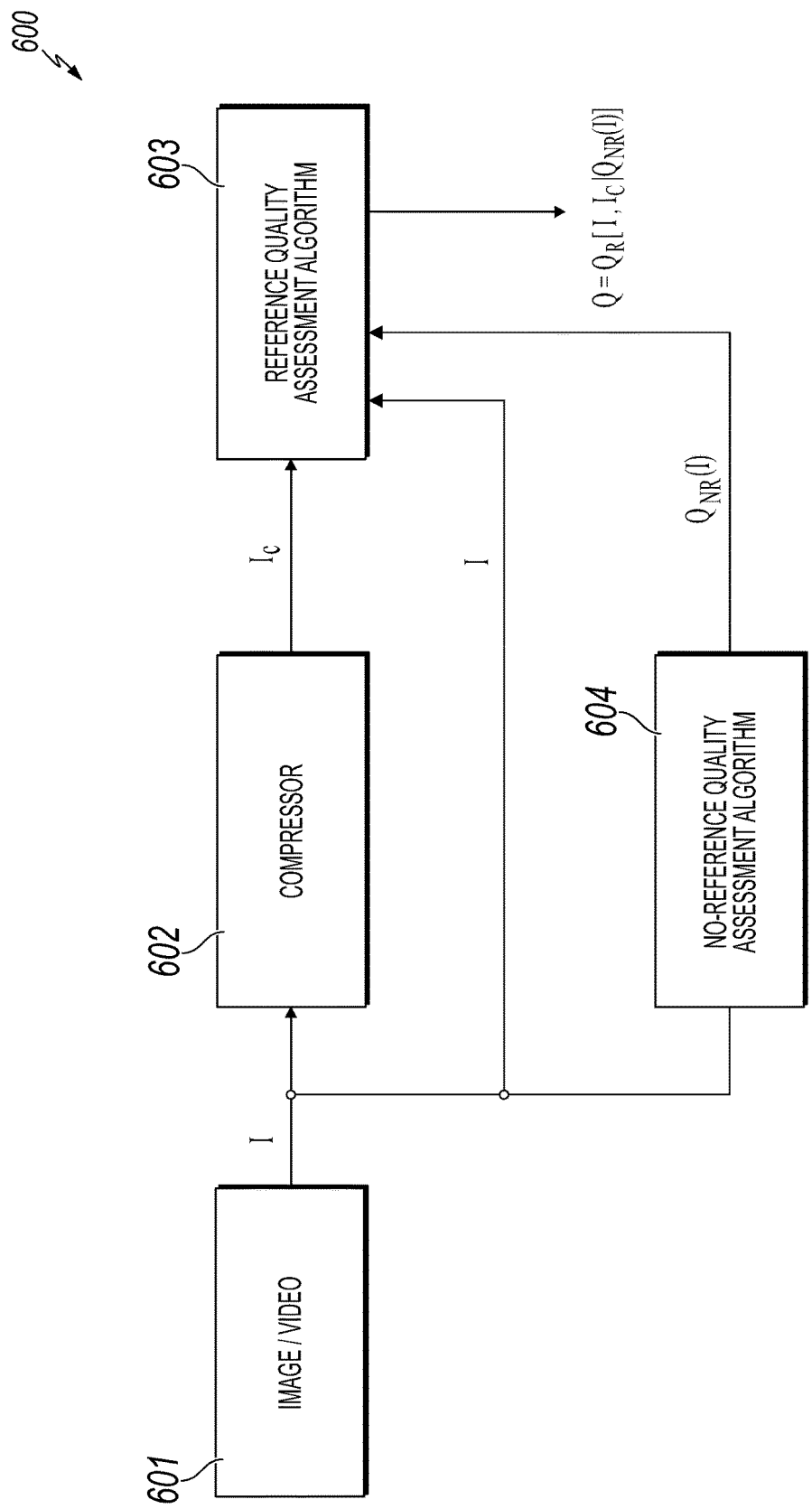
FIG. 6 is an additional illustration of assessing the quality of images or videos using the method of FIG. 2 in accordance with an embodiment of the present invention.

Referring to FIG. 6, an image/video 601 may be processed (e.g., compressed) via compressor 602. While FIG. 6 illustrates the process of compression, it is noted that the principles of the present invention are to include other types of processing operations, such as denoising, deblurring, enhancement, etc. In one embodiment, compressor 602 is a software module of application 104. The compressed image/video is then quality assessed by reference quality assessment algorithm 603.

Alternatively, the image/video 601 may be directly quality assessed by reference quality assessment algorithm 603.

Furthermore, the image/video 601 may alternatively be quality assessed by a no-reference quality assessment algorithm 604 whose quality measurement, such as via a score as discussed above, is provided to reference quality assessment algorithm 603 to generate a more accurate and complete score or measurement.

The total quality measurement (Q) of the image/video ("reference quality assessment algorithm conditional on the no-reference quality assessment") may be expressed mathematically as:

$$Q=Q_R[I,I_c|Q_{NR}(I)]$$

where Q corresponds to a total quality measurement, $Q_R$ corresponds to the quality measurement of reference quality assessment algorithm 603, $Q_{NR}$ corresponds to the quality measurement of the no-reference quality assessment algorithm 604, I corresponds to the image which is generally distorted or degraded and corresponds to the compressed image. Hence, as expressed mathematically, the quality measurement of reference quality assessment algorithm 603 is conditional upon the quality measurement of no-reference quality assessment algorithm 604.

Furthermore, as expressed mathematically, the total quality measurement increases with an increasing $Q_{NR}$ and vice-versa. In one embodiment, the above expression may be expressed mathematically in a different form where the total quality measurement increases with a decreasing $Q_{NR}$ and vice-versa.

Conditional models that model the total quality measurement may be generated based on this mathematical expression, such as by a simple product:

$$Q=Q_R[I,I_c]*Q_{NR}(I)$$

Variations of such a conditional model include scaling the quality measurements of the reference quality assessment algorithm and the no-reference quality assessment algorithm, such as from 0 to 1. For example, the scaled conditional model may be shown as:

$$Q=S_1\{Q_R[I,I_c]\}*S_2\{Q_{NR}(I)\}$$

where $S_1$ and $S_2$ represent scaling functions that scale the quality measurements.

Alternatively, the conditional model could be scaled to difference mean opinion scores (DMOS) or mean opinion scores (MOS). For example, given MOS/DMOS scores of known images/videos, $Q_{NR}$ is mapped to MOS/DMOS shown as:

$$D_1\{Q_{NR}(I)\}$$

Given MOS/DMOS scores of known images/videos, $Q_R$ is mapped to MOS/DMOS shown as:

$D_2\{Q_R (I, I_c)\}$, where I could be a pristine image or a distorted image.

The resulting total quality measurement can now be shown as:

$$Q=D_1*D_2$$

In one embodiment, MOS or DMOS could be mapped to a range, such as [0,100] or [0, 1], resulting in both the scaled variation and MOS/DMOS scaled variation discussed above.

Furthermore, the total quality measurement may be modeled based on a functional mapping, such as shown in the following equation:

$$Q=F[Q_R(I,I_c),Q_{NR}(I)]$$

where F corresponds to a parametric function of two quality arguments (e.g., bilinear, bicubic, bi-polynomial).

In one embodiment, the function may be obtained using two-dimensional function fitting (e.g., curve-fitting, regression) from the data. In another embodiment, the function may be obtained from a learning algorithm, support vector regression, random forest regression, deep regression, machine learning algorithm, deep learning algorithm, convolutional neural network, statistical model based on conditional expectations (e.g., Bayesian), conditional entropy, etc.

The measurements or scores of the no-reference quality assessment algorithm and the reference quality assessment algorithm may be used by visual processing system 100 to determine whether further enhancement or correction needs to be performed on the image or video which exhibits excessive degradation or distortion as discussed below in connection with FIGS. 7-8.

Figure 7:
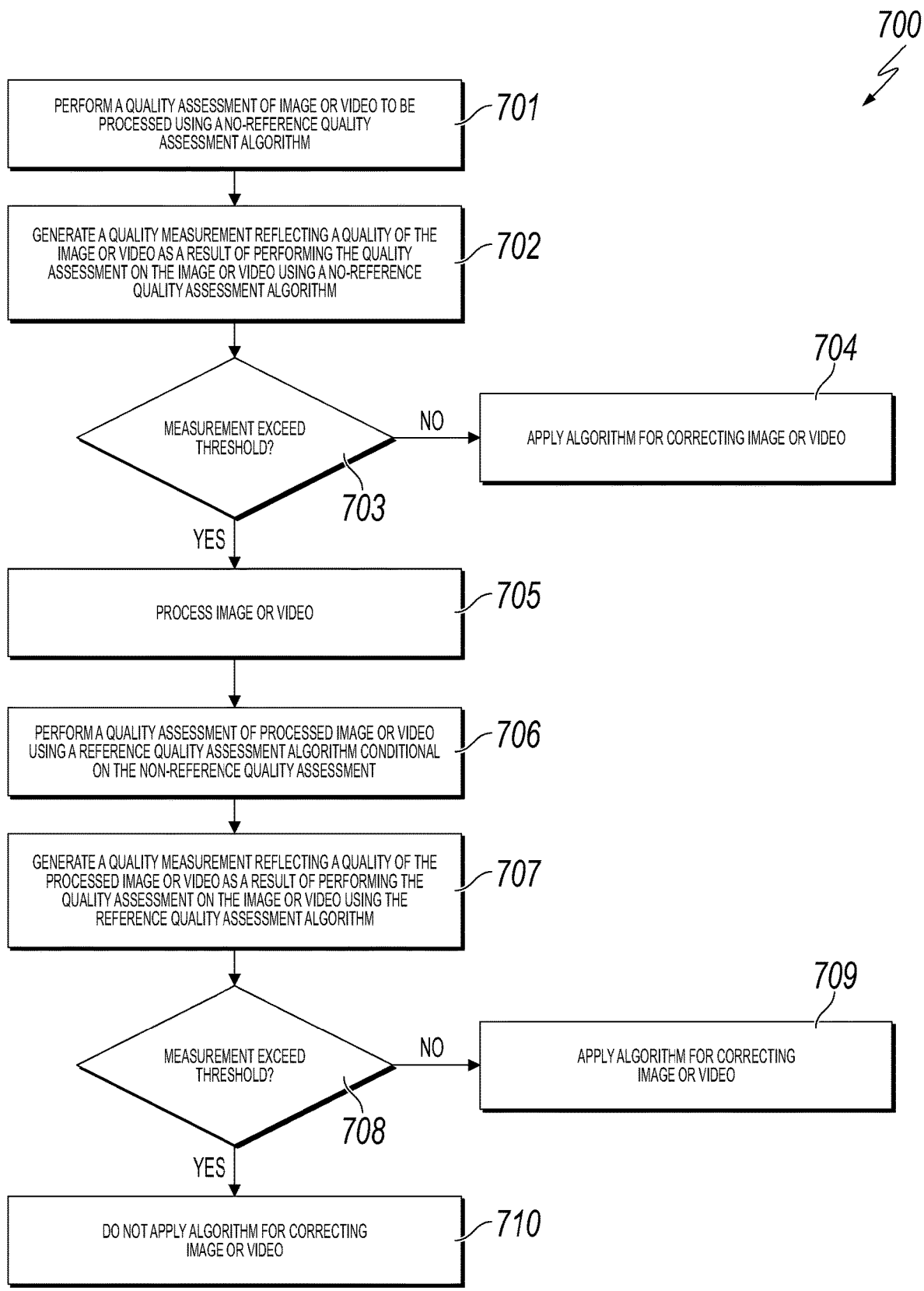
FIG. 7 is a flowchart of a method for correcting degraded or distorted images or videos using the two-stage quality assessment of the present invention in accordance with an embodiment of the present invention.

FIG. 7 is a flowchart of a method 700 for correcting degraded or distorted images or videos using the two-stage quality assessment of the present invention in accordance with an embodiment of the present invention Referring to FIG. 7, in conjunction with FIGS. 1-2, in step 701, visual processing system 100 performs a quality assessment of an image or video to be processed using a no-reference quality assessment algorithm as in step 201.

In step 702, visual processing system 100 generates a quality measurement (e.g., score) reflecting a quality of the image or video as a result of performing the quality assessment on the image or video using the no-reference quality assessment algorithm as in step 202. Such a score or measurement reflects the quality (e.g., lack of distortion) of the image or video.

In step 703, a determination is made by visual processing system 100 as to whether the quality measurement generated in step 702 exceeds a threshold, indicating that the image or video meets a required level of quality. While the present invention is discussed in connection with determining whether the quality measurement generated in step 702 exceeds a threshold to determine whether the image or video meets a required level of quality, it is noted that the principles of the present invention may make such a determination based on whether the quality measurement generated in step 702 is less than a threshold. The determination of whether the quality measurement exceeds or is less than a threshold to determine whether the image or video meets a required level of quality is based on implementation preference and the principles of the present invention are not to be limited in scope to either implementation.

If the quality measurement does not exceed the threshold, then, in step 704, visual processing system 100 applies an algorithm for correcting the image or video. That is, visual processing system 100 applies an algorithm for correcting the lack of quality, such as noise, blurring, etc., exhibited by the image or video as indicated by the measurement provided by the no-reference quality assessment algorithm. In this manner, by correcting the perceived degradation or distortion in the image or video prior to applying the reference quality assessment algorithm, the reference quality assessment algorithm will be able to provide a more accurate and complete assessment of the quality of the image or video.

If, however, the quality measurement exceeds the threshold, then, in step 705, visual processing system 100 processes (e.g., compresses) the image or video as in step 203.

In step 706, visual processing system 100 performs a quality assessment of the processed image or video using a reference quality assessment algorithm conditional on the no-reference quality assessment as in step 204. As discussed above, the image or video may be corrected, if needed, to correct excessive degradation or distortion prior to processing based on the no-reference quality assessment. In this manner, the reference quality assessment algorithm renders a quality measurement on the processed image/video that is contingent or conditional on the no-reference quality measurement assigned to the image or video.

In step 707, visual processing system 100 generates a quality measurement reflecting a quality of the processed image or video as a result of performing the quality assessment on the image or video using the reference quality assessment algorithm.

In step 708, a determination is made by visual processing system 100 as to whether the quality measurement generated in step 707 exceeds a threshold, indicating that the image or video meets a required level of quality. While the present invention is discussed in connection with determining whether the quality measurement generated in step 707 exceeds a threshold to determine whether the image or video meets a required level of quality, it is noted that the principles of the present invention may make such a determination based on whether the quality measurement generated in step 707 is less than a threshold. The determination of whether the quality measurement exceeds or is less than a threshold to determine whether the image or video meets a required level of quality is based on implementation preference and the principles of the present invention are not to be limited in scope to either implementation.

In one embodiment, threshold determination step 703 and/or threshold determination step 708 discussed above may be dispensed with entirely, on a possible non-limiting presumption that the distortion is always present or that the image or video will always benefit by the correction process. In such an embodiment, steps 703, 704 and/or steps 708, 709 may be eliminated.

If the quality measurement does not exceed the threshold, then, in step 709, visual processing system 100 applies an algorithm for correcting the image or video. That is, visual processing system 100 applies an algorithm for correcting the lack of quality, such as noise, blurring, etc., exhibited by the image or video as indicated by the quality measurement provided by the reference quality assessment algorithm.

If, however, the quality measurement exceeds the threshold, then, in step 710, visual processing system 100 does not apply an algorithm for correcting the image or video. In one embodiment, in the case where no threshold is deployed, the algorithm will correct the image or video.

A diagram of assessing the quality of images or videos using the method of FIG. 7 is provided below in connection with FIG. 8 in accordance with an embodiment of the present invention.

Figure 8:
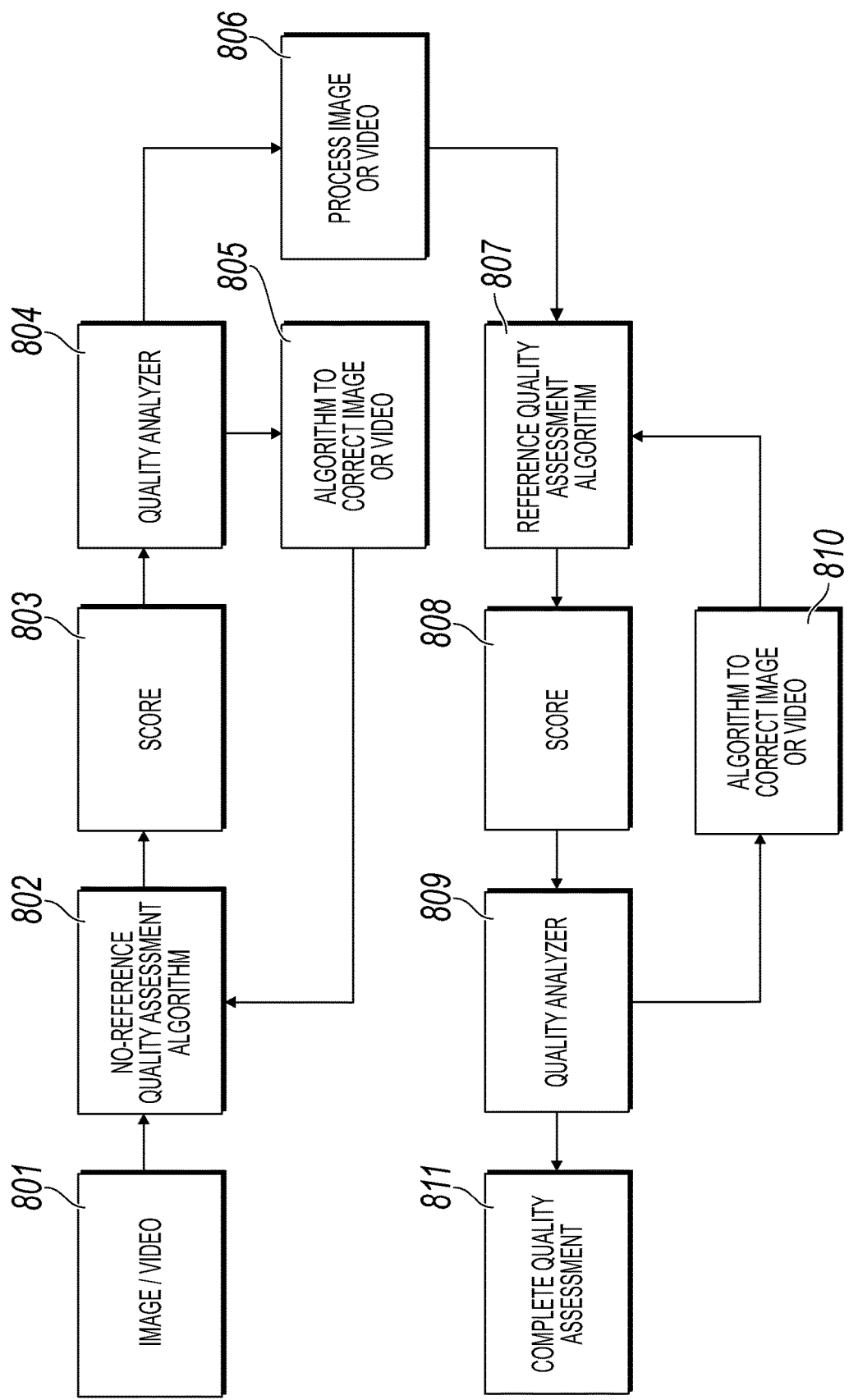
FIG. 8 is a diagram of assessing the quality of images or videos using the method of FIG. 7 in accordance with an embodiment of the present invention.

Referring to FIG. 8, the quality of an image or video 801 is assessed by a no-reference quality assessment algorithm 802 which generates a score 803. The score 803 is then analyzed by quality analyzer 804. In one embodiment, quality analyzer 804 is a software module of application 104 used to determine whether the score or quality measurement indicates that the image or video 801 meets a required level of quality. If the image or video 801 does not meet a required level of quality, then the degradation or distortion of the image or video 801 is corrected by an algorithm 805. After the degradation or distortion of the image or video 801 is corrected by algorithm 805, the quality of the corrected image or video is assessed by the no-reference quality assessment algorithm 802 (or a reference quality assessment algorithm) which generates a score 803.

If, however, the image or video 801 meets a required level of quality, then the image or video 801 is processed 806. The quality of the processed image or video is assessed by a reference quality assessment algorithm 807 and generates a score 808 reflecting a level of quality. The score 808 is then analyzed by quality analyzer 809 to determine whether the processed image or video 806 meets a required level of quality. If the quality of the processed image or video 806 does not meet a required level of quality, then the degradation or distortion of the processed image or video 806 is corrected by an algorithm 810. After the degradation or distortion of the processed image or video 806 is corrected by algorithm 810, the quality of the corrected image or video is assessed by the reference quality assessment algorithm 807 which generates a score 808.

If, however, the processed image or video 806 meets a required level of quality, then the image/video quality assessment is complete 811.

As a result of implementing the present invention where the quality measurement of the reference quality assessment algorithm is conditional on the quality measurement of the no-reference quality assessment algorithm, a more accurate quality measurement of the image or video is provided by the reference quality assessment algorithm.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for assessing quality of images or videos, the method comprising:
performing, by a processor, a first quality assessment of an image or a video to be processed using a no-reference quality assessment algorithm;
generating a first quality measurement as a result of performing said first quality assessment of said image or said video, wherein said first quality measurement reflects a quality of said image or said video; and
performing, by said processor, a second quality assessment of said image or said video using a reference quality assessment algorithm conditional on said first quality measurement.

2. The method as recited in claim 1 further comprising:
processing said image or said video; and
performing said second quality assessment of said image or said video after said image or said video has been processed using said reference quality assessment algorithm conditional on said first quality measurement.

3. The method as recited in claim 2, wherein said processing comprises one or more of the following: compression, denoising, deblurring, enhancement, deblocking and transcoding.

4. The method as recited in claim 1, wherein said no-reference quality assessment algorithm comprises one of the following: no-reference quality assessment algorithms include blind/referenceless image spatial quality evaluator (BRISQUE), distortion identification-based image verity and integrity evaluation (DIIVINE), blind image quality index (BIQI), natural image quality evaluator (NIQE), blind image integrity notator using discrete cosine transform statistics (BLIINDS), BLIINDS-II, blind image quality assessment (BIQA), and integrated local natural image quality evaluator (IL-NIQE).

5. The method as recited in claim 1, wherein said reference quality assessment algorithm comprises one of the following: perceptual quality, structural information, structural similarity (SSIM), multi-scale SSIM, visual information fidelity (VIF), visual signal-to-noise ratio (VSNR), peak signal-to-noise ratio (PSNR), noise quality measure (NQM), most apparent distortion (MAD), reduced reference entropic differencing (RRED), spatio-temporal RRED (ST-RRED), and spatial efficient entropic differencing for image and video quality (SpEED-QA).

6. The method as recited in claim 1 further comprising:
processing said image or said video in response to said first quality measurement exceeding a first threshold.

7. The method as recited in claim 1 further comprising:
applying an algorithm for correcting said image or said video in response to said first quality measurement being less than a first threshold.

8. The method as recited in claim 1 further comprising:
classifying a distortion of said image or said video based on said first quality measurement; and
providing said classification to said reference quality assessment algorithm.

9. The method as recited in claim 1 further comprising:
generating a second quality measurement as a result of performing said second quality assessment of said image or said video, wherein said second quality measurement reflects a quality of said image or said video.

10. The method as recited in claim 9 further comprising:
applying an algorithm for correcting said image or said video in response to said second quality measurement being less than a second threshold.

11. The method as recited in claim 9 further comprising:
not applying an algorithm for correcting said image or said video in response to said second quality measurement exceeding a second threshold.

12. The method as recited in claim 9 further comprising:
adaptively processing a current or a subsequent image or video using said second quality measurement of said reference quality assessment algorithm.

13. The method as recited in claim 9, wherein a total quality measurement is equal to said second quality measurement of said reference quality assessment algorithm that is conditional on said first quality measurement of said no-reference quality assessment algorithm.

14. The method as recited in claim 13, wherein said total quality measurement is modeled using a conditional model.

15. The method as recited in claim 13, wherein said total quality measurement is modeled as a function of said second quality measurement of said reference quality assessment algorithm and said first quality measurement of said no-reference quality assessment algorithm.

16. A computer program product for assessing quality of images or videos, the computer program product comprising a computer readable storage medium having program code embodied therewith, the program code comprising the programming instructions for:
performing a first quality assessment of an image or a video to be processed using a no-reference quality assessment algorithm;
generating a first quality measurement as a result of performing said first quality assessment of said image or said video, wherein said first quality measurement reflects a quality of said image or said video; and
performing a second quality assessment of said image or said video using a reference quality assessment algorithm conditional on said first quality measurement.

17. The computer program product as recited in claim 16, wherein the program code further comprises the programming instructions for:
processing said image or said video; and
performing said second quality assessment of said image or said video after said image or said video has been processed using said reference quality assessment algorithm conditional on said first quality measurement.

18. The computer program product as recited in claim 17, wherein said processing comprises one or more of the following: compression, denoising, deblurring, enhancement, deblocking and transcoding.

19. The computer program product as recited in claim 16, wherein said no-reference quality assessment algorithm comprises one of the following: no-reference quality assessment algorithms include blind/referenceless image spatial quality evaluator (BRISQUE), distortion identification-based image verity and integrity evaluation (DIIVINE), blind image quality index (BIQI), natural image quality evaluator (NIQE), blind image integrity notator using discrete cosine transform statistics (BLIINDS), BLIINDS-II, blind image quality assessment (BIQA), and integrated local natural image quality evaluator (IL-NIQE).

20. The computer program product as recited in claim 16, wherein said reference quality assessment algorithm comprises one of the following: perceptual quality, structural information, structural similarity (SSIM), multi-scale SSIM, visual information fidelity (VIF), visual signal-to-noise ratio (VSNR), peak signal-to-noise ratio (PSNR), noise quality measure (NQM), most apparent distortion (MAD), reduced reference entropic differencing (RRED), spatio-temporal RRED (ST-RRED), and spatial efficient entropic differencing for image and video quality (SpEED-QA).

21. The computer program product as recited in claim 16, wherein the program code further comprises the programming instructions for:
processing said image or said video in response to said first quality measurement exceeding a first threshold.

22. The computer program product as recited in claim 16, wherein the program code further comprises the programming instructions for:
applying an algorithm for correcting said image or said video in response to said first quality measurement being less than a first threshold.

23. The computer program product as recited in claim 16, wherein the program code further comprises the programming instructions for:
classifying a distortion of said image or said video based on said first quality measurement; and
providing said classification to said reference quality assessment algorithm.

24. The computer program product as recited in claim 16, wherein the program code further comprises the programming instructions for:
generating a second quality measurement as a result of performing said second quality assessment of said image or said video, wherein said second quality measurement reflects a quality of said image or said video.

25. The computer program product as recited in claim 24, wherein the program code further comprises the programming instructions for:
applying an algorithm for correcting said image or said video in response to said second quality measurement being less than a second threshold.

26. The computer program product as recited in claim 24, wherein the program code further comprises the programming instructions for:
not applying an algorithm for correcting said image or said video in response to said second quality measurement exceeding a second threshold.

27. The computer program product as recited in claim 24, wherein the program code further comprises the programming instructions for:
adaptively processing a current or a subsequent image or video using said second quality measurement of said reference quality assessment algorithm.

28. The computer program product as recited in claim 24, wherein a total quality measurement is equal to said second quality measurement of said reference quality assessment algorithm that is conditional on said first quality measurement of said no-reference quality assessment algorithm.

29. The computer program product as recited in claim 28, wherein said total quality measurement is modeled using a conditional model.

30. The computer program product as recited in claim 28, wherein said total quality measurement is modeled as a function of said second quality measurement of said reference quality assessment algorithm and said first quality measurement of said no-reference quality assessment algorithm.

31. A system, comprising:
a memory unit for storing a computer program for assessing quality of images or videos; and
a processor coupled to the memory unit, wherein the processor is configured to execute the program instructions of the computer program comprising:
performing a first quality assessment of an image or a video to be processed using a no-reference quality assessment algorithm;
generating a first quality measurement as a result of performing said first quality assessment of said image or said video, wherein said first quality measurement reflects a quality of said image or said video; and
performing a second quality assessment of said image or said video using a reference quality assessment algorithm conditional on said first quality measurement.

32. The system as recited in claim 31, wherein the program instructions of the computer program further comprise:
processing said image or said video; and
performing said second quality assessment of said image or said video after said image or said video has been processed using said reference quality assessment algorithm conditional on said first quality measurement.

33. The system as recited in claim 32, wherein said processing comprises one or more of the following: compression, denoising, deblurring, enhancement, deblocking and transcoding.

34. The system as recited in claim 31, wherein said no-reference quality assessment algorithm comprises one of the following: no-reference quality assessment algorithms include blind/referenceless image spatial quality evaluator (BRISQUE), distortion identification-based image verity and integrity evaluation (DIIVINE), blind image quality index (BIQI), natural image quality evaluator (NIQE), blind image integrity notator using discrete cosine transform statistics (BLIINDS), BLIINDS-II, blind image quality assessment (BIQA), and integrated local natural image quality evaluator (IL-NIQE).

35. The system as recited in claim 31, wherein said reference quality assessment algorithm comprises one of the following: perceptual quality, structural information, structural similarity (SSIM), multi-scale SSIM, visual information fidelity (VIF), visual signal-to-noise ratio (VSNR), peak signal-to-noise ratio (PSNR), noise quality measure (NQM), most apparent distortion (MAD), reduced reference entropic differencing (RRED), spatio-temporal RRED (ST-RRED), and spatial efficient entropic differencing for image and video quality (SpEED-QA).

36. The system as recited in claim 31, wherein the program instructions of the computer program further comprise:
processing said image or said video in response to said first quality measurement exceeding a first threshold.

37. The system as recited in claim 31, wherein the program instructions of the computer program further comprise:
applying an algorithm for correcting said image or said video in response to said first quality measurement being less than a first threshold.

38. The system as recited in claim 31, wherein the program instructions of the computer program further comprise:
classifying a distortion of said image or said video based on said first quality measurement; and
providing said classification to said reference quality assessment algorithm.

39. The system as recited in claim 31, wherein the program instructions of the computer program further comprise:

generating a second quality measurement as a result of performing said second quality assessment of said image or said video, wherein said second quality measurement reflects a quality of said image or said video.

40. The system as recited in claim 39, wherein the program instructions of the computer program further comprise:

applying an algorithm for correcting said image or said video in response to said second quality measurement being less than a second threshold.

41. The system as recited in claim 39, wherein the program instructions of the computer program further comprise:

not applying an algorithm for correcting said image or said video in response to said second quality measurement exceeding a second threshold.

42. The system as recited in claim 39, wherein the program instructions of the computer program further comprise:

adaptively processing a current or a subsequent image or video using said second quality measurement of said reference quality assessment algorithm.

43. The system as recited in claim 39, wherein a total quality measurement is equal to said second quality measurement of said reference quality assessment algorithm that is conditional on said first quality measurement of said no-reference quality assessment algorithm.

44. The system as recited in claim 43, wherein said total quality measurement is modeled using a conditional model.

45. The system as recited in claim 43, wherein said total quality measurement is modeled as a function of said second quality measurement of said reference quality assessment algorithm and said first quality measurement of said no-reference quality assessment algorithm.

* * * * *